United States Patent [19]

Bishop et al.

[11] Patent Number: 4,514,037
[45] Date of Patent: Apr. 30, 1985

[54] ULTRAVIOLET CURABLE OUTER COATINGS FOR OPTICAL FIBER

[75] Inventors: Timothy E. Bishop, Arlington Hgts.; Joseph J. Stanton, Buffalo Grove; George Pasternack, Lincolnshire; Orvid R. Cutler, Jr., Rolling Meadows, all of Ill.

[73] Assignee: DeSoto, Inc., Des Plaines, Ill.

[21] Appl. No.: 544,010

[22] Filed: Oct. 21, 1983

[51] Int. Cl.³ .............................................. G02B 5/172
[52] U.S. Cl. .............................. 350/96.23; 350/96.34; 350/96.29; 350/96.30; 350/96.33; 428/375; 428/378; 428/392; 427/54.1; 427/165; 427/331; 427/407.2; 525/454; 525/455; 525/920; 204/159.19
[58] Field of Search ............... 350/96.33, 96.34, 96.29, 350/96.30, 96.23; 428/375, 378, 392; 427/54.1, 165, 168, 169, 331, 407.2; 525/454, 455, 920; 204/159.19

[56] References Cited

U.S. PATENT DOCUMENTS

| | | | |
|---|---|---|---|
| 3,980,390 | 9/1976 | Yamamoto et al. | 350/96.34 |
| 4,147,407 | 4/1979 | Eichenbaum et al. | 350/96.29 |
| 4,255,243 | 3/1981 | Coqueugniot et al. | 525/920 |
| 4,264,752 | 4/1981 | Watson | 528/371 |
| 4,270,840 | 6/1981 | Uchida et al. | 350/96.34 |
| 4,311,726 | 1/1982 | Hacker et al. | 350/96.34 |
| 4,334,733 | 6/1982 | Takeshima et al. | 350/96.34 |
| 4,344,669 | 8/1982 | Uchida et al. | 428/375 |

*Primary Examiner*—Richard Bueker
*Attorney, Agent, or Firm*—Dressler, Goldsmith, Shore, Sutker & Milnamow, Ltd.

[57] ABSTRACT

Buffer-coated and overcoated optical glass fiber is disclosed in which the topcoat has the high strength and high tensile modulus combined with good elongation and water resistance associated with extruded jacket coatings, but which is applied by ordinary coating procedures and cured by exposure to ultraviolet radiation. The coating compositions which enable this to be achieved comprise 30% to about 80% of linear diacrylate-functional polyurethanes which are the linear polyurethane reaction product of polycarbonate diol with organic diisocyanate in molar proportions providing an average of at least about 2 urethane linkages per molecule, these linear polyurethanes being end-capped with acrylate groups, and these polyurethanes being used in combination with at least 15% of liquid monoethylenically unsaturated monomer having a glass transition temperature above about 55° C.

7 Claims, No Drawings

ULTRAVIOLET CURABLE OUTER COATINGS FOR OPTICAL FIBER

DESCRIPTION

1. Technical Field

This invention relates to ultraviolet curable coating compositions which are adapted to be employed as an overcoating on buffer coated optical glass fiber in order to provide superior physical properties, and it includes the production of such overcoated fiber and the overcoated fiber itself.

2. Background Art

Optical glass fiber is presently protected by applying to the freshly formed glass fiber a buffer coating of a resin which possesses an appropriate refractive index and a low tensile modulus which remains low at very low temperature ($-60°$ C.) to minimize the danger of microbending when such low temperatures are encountered. For rapid application and cure, coatings which cure on exposure to ultraviolet radiation are needed. Unfortunately, these buffer coatings, and especially those cured with ultraviolet radiation, are not very resistant to moisture and they lack abrasion resistance.

To improve the properties of the coated optical fibers, it has been found to be desirable to topcoat the buffer coated optical glass fiber with a tough and flexible overcoat which possesses superior resistance to moisture and abrasion. In order to obtain the desired properties in optical glass fibers which have been buffer coated and then topcoated, resort has been had to the use of extruded Nylon "jacket" coatings, but these are more expensive and more difficult to apply than an ultraviolet-cured coating.

It is also known to apply both coatings at high speed using an ultraviolet-curable topcoat on top of a buffer coating which has been ultraviolet cured, but the topcoats have not possessed the needed resistance to moisture and rupture without being inadequately flexible. As a matter of interest, by applying both coatings sequentially to freshly drawn optical glass fiber, one avoids the possibility of damaging the buffer coated fiber and achieves a considerable economy.

This invention is concerned with the problem of providing ultraviolet-cured topcoatings which will duplicate, or substantially duplicate, the properties which are now obtained using the extruded "jacket" coatings noted above so that high speed coating procedures can be used to economically produce buffer coated and topcoated optical glass fiber which will satisfy the demanding commercial requirements which are insisted upon.

DISCLOSURE OF INVENTION

In accordance with this invention, certain linear diacrylate polyurethanes based on a polycarbonate diol are incorporated into an ultraviolet-curable coating composition which, when used to deposit a 3 mil test film, will cure on ultraviolet exposure to possess a tensile strength of at least 2500 psi. in combination with a room temperature (20° C.) tensile modulus of at least 50,000 psi. Prior ultraviolet-cured coatings having this considerable strength lacked desired flexibility, evidenced by an elongation of less than 20%. In contrast, when the coatings of this invention are cured with ultraviolet light, they combine the indicated high strength and high tensile modulus with an elongation in excess of about 40%, preferably in excess of 100%. Also, the coatings of this invention exhibit better water vapor transmission resistance than the prior ultraviolet-cured topcoatings.

More particularly, in this invention buffer-coated optical glass fiber is overcoated with a topcoat having the high strength and tensile modulus noted previously combined with good elongation and water resistance, as is now associated with extruded jacket coatings, but which is applied by ordinary coating procedures and cured by exposure to ultraviolet radiation. This is accomplished by applying to buffer-coated optical glass fiber an ultraviolet-curable coating composition comprising a combination of a linear diacrylate-functional polyurethane based on a polycarbonate diol and liquid monoethylenically unsaturated monomer having a glass transition temperature above about 55° C., and then exposing the coated fiber to ultraviolet radiation to cure the same.

To provide coating compositions capable of forming films of the desired character, we have found that one must rely upon certain linear diacrylate-functional polyurethanes which are more particularly defined hereinafter. These are broadly described as the linear polyurethane reaction product of polycarbonate diol with organic diisocyanate in molar proportions providing an average of at least about 2 urethane linkages per molecule, this linear polyurethane being end-capped with acrylate groups in a manner adding further urethane linkages.

When the diisocyanate is in molar excess, the linear polyurethane formed by reaction with the diol is isocyanate terminated, and it is end capped by reacting it with an acrylate-functional compound carrying a single isocyanate-reactive hydroxyl group, such as 2-hydroxyethyl acrylate or 2-hydroxypropyl acrylate. If the polycarbonate diol is in molar excess, then the polyurethane formed by reaction with the diisocyanate can be end capped by reacting it with an acrylate-functional compound carrying a single isocyanate group, such as the reaction product of equimolar proportions of 2-hydroxyethyl acrylate with a diisocyanate, such as 2,4-toluene diisocyanate or isophorone diisocyanate, possessing one isocyanate group more strongly reactive than the other.

The molar excess used helps to determine the molecular weight of the polyurethane, and thus the average number of urethane linkages which are present. As previously indicated, the polyurethane formed by reaction of the diisocyanate and the diol will contain an average of at least 2 urethane linkages per molecule. The end capping of this polyurethane adds additional linkages, but these are not included in the computation because they are not part of the polyurethane which is end capped.

The diacrylate-terminated polycarbonate diol polyurethanes which are used herein have the formula:

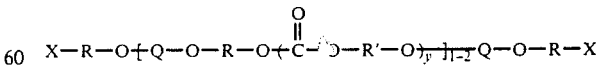

in which R is alkylene having from 1-20 carbon atoms, preferably 2-4 carbon atoms, and is illustrated by the ethylene, propylene and butylene radicals; R' is the residue of an alkylene diol containing from 2-12, preferably from 3-8 carbon atoms, and is illustrated by the residue of 1,4-butane diol or 1,6-hexane diol; Q is the residue of an organic diisocyanate; X is the residue of acrylic acid; y is at least 1, and R' and y are selected to provide a molecular weight for the polycarbonate diol reactant of from 300 to 3000, preferably from 600 to 1500.

It is desired to point out that the polycarbonate diols, and also polyurethanes made therefrom by reaction with diisocyanates, are themselves known compounds, as illustrated in U.S. Pat. No. 4,264,752, but it has not previously been recognized that the properties of certain of these polyurethanes in combination with ethylenically unsaturated monomers of high glass transition temperature (measured on a homopolymer of the monomer) would enable a practical solution to the standing industrial problem of providing ultraviolet curable topcoating compositions for the overcoating of buffer-coated optical glass fiber.

The polycarbonate polyurethane diacrylates used herein are combined with liquid components to provide the coating viscosity which is desired and also to provide the strength and tensile modulus needed in the cured coatings. The polycarbonate polyurethane diacrylate component allows these characteristics to be combined with the flexibility which is desired. The use of high glass transition temperature monomers in compositions not herein contemplated is itself known, but the combination of high strength and flexibility achieved herein has not previously been provided.

Many monoethylenically unsaturated monomers of high glass transition temperature are known for inclusion in radiation-curable coating compositions, and several of these are illustrated in the examples herein. At least about 15% of the reactive components in the composition are monomers having a glass transition temperature above about 55° C. These are illustrated by dimethyl acrylamide, N-vinyl pyrrolidone, isobornyl acrylate, acrylic acid and dicyclopentenyl acrylate. They all render the composition more fluid, which aids rapid application. It is preferred not to use more than 45% to avoid excessive fluidity.

Also, it is permissible to include minor amounts, up to about 25%, of low molecular weight polyacrylates, such as trimethylol propane triacrylate, or pentaerythritol triacrylate, for these also reduce the viscosity and increase strength.

In the coating compositions which are employed, the polycarbonate polyurethane diacrylates should constitute at least about 30% of the reactive components in the coating, preferably at least about 40%. As a practical matter, the polycarbonate polyurethane diacrylates will not exceed about 80% of the coating composition, preferably not in excess of 70%.

Minor proportions of volatile nonreactive solvents, such as acetone or ethyl alcohol, may also be present to adjust viscosity, but this is not preferred because the rapid action needed on the fiber-forming equipment makes it difficult to volatilize away any large amount of solvent prior to ultraviolet exposure.

The buffer coatings which may be used will vary considerably, but these are characterized by a relatively low tensile modulus at room temperature. It is because the buffer coating on the optical glass fiber has a room temperature modulus below 10,000 psi, preferably below 2,000 psi, that overcoating becomes important. Very low modulus ultraviolet-cured coatings which are usually overcoated are described in the application of R. Ansel Ser. No. 170,148 filed July 18, 1980. These can be described as ethylenic-terminated polyurethane, polyamide or polyurea oligomers having a molecular weight in the range of about 2000 to about 8000 and containing one amide, urea or urethane group for every 300 to 900 units of molecular weight, and containing polyalkylene polyether, polyalkylene polythiol or polyalkylene polyester in which the alkylene moiety contains 2 to 6 carbon atoms. These diacrylate oligomers are combined with 20% to 50% of the composition of a radiation-curable monoethylenic monomer having a $T_g$ below about $-10°$ C., such as phenoxyethyl acrylate, and with 2% to 20% of a monoethylenic monomer having a strong capacity for hydrogen bonding, such as N-vinyl pyrrolidone.

The end capping of the linear polyurethane can be achieved using many other capping agents. Thus, while 2-hydroxyethyl acrylate was mentioned previously, and is a preferred agent for this purpose, one can also use 2-hydroxypropyl and 2-hydroxybutyl acrylate.

The radiation which will effect cure will vary with the photinitiator which is used. The usual photoinitiators are ketonic, such as about 3% of diethoxy acetophenone. Other photoinitiators are illustrated by acetophenone, benzophenone, m-chloro acetophenone, propiophenone, thioxanthone, benzoin, benzil, anthraquinone, and the like. These photoinitiators may be used singly or in mixtures, and are present in an amount up to about 10% of the coating (usually 1-5%) when ultraviolet cure is intended. Various amines may also be added to enhance the cure, such as diethyl amine, but this is not essential.

Even visible light not too remote from the ultraviolet range may be employed using appropriate photoinitiators. These are illustrated by camphor quinone and coumarin which are used together with a tertiary amine, such as triethyl amine. Diphenylbenzoylphosphine is also useful in and near the ultraviolet range.

Throughout this application, including the examples and claims which follow, all parts and proportions are by weight, unless otherwise stated.

EXAMPLE 1

There were charged to a 250 ml three neck round bottom flask equipped with a thermometer, distilling column, heating mantle, magnetic stirrer, distilling head, air condenser, receiver and vacuum attachments, 45 grams of 1,4-butanediol, 85.6 grams of diphenyl carbonate and 0.1 gram of sodium hydroxide. The flask was evacuated to a pressure of about 10 mm Hg and the mixture was stirred and heated to about 100° C. and kept at these conditions for about three hours during which slow phenol distillation was observed. After three hours the pressure was reduced to 1 mm Hg and the temperature raised to 120° C. for 1 hour to complete the phenol distillation. After 1 hour the residue was cooled to room temperature and acetic acid was added dropwise until the mixture was neutralized. A distillate of 75.5 grams of phenol and a residue of 53.2 grams of a polymeric carbonate diol having a number average molecular weight of 554 was recovered.

The polycarbonate produced above is a linear polymer having one hydroxyl group at each end thereof, so it is a polycarbonate diol.

EXAMPLE 2

1 molar proportion of the polycarbonate diol of Example 1 is reacted with 2 molar proportions of isophorone diisocyanate in the presence of a trace of dibutyl tin dilaurate to provide an isocyanate-terminated polyurethane, and 2 molar proportions of 2-hydroxyethyl acrylate are then added and reacted in to end cap the polymer and provide a diacrylate polymer.

EXAMPLE 3

50 parts of the diacrylate polymer of Example 2 are mixed with 46.8 parts of N,N-dimethylacrylamide, 3 parts of a photoinitiator (see note 1), 0.01 part of phenothiazine and 0.2 part of a polysiloxane polycarbinol (see note 2) to provide an ultraviolet curable coating composition having a room temperature viscosity of 320 centipoises. On ultraviolet cure of a film cast on glass and removed to provide a film having a thickness of 3 mil, the cured film was found to have excellent properties closely resembling that of a Nylon film of the same thickness. These properties will be tabulated hereinafter.

EXAMPLE 4

60 parts of the diacrylate polymer of Example 2 are mixed with 26.0 parts of isobornyl acrylate, 10 parts of acrylic acid, 3 parts of a photoinitiator (see note 1), and 0.01 part of phenothiazine to provide an ultraviolet curable coating composition having a room temperature viscosity of 4540 centipoises. On ultraviolet cure of a film cast on glass and removed to provide a film having a thickness of 3 mil, the cured film was found to have excellent properties closely resembling that of a Nylon film of the same thickness. These properties will be tabulated hereinafter.

EXAMPLE 5

60 parts of the diacrylate polymer of Example 2 are mixed with 27.0 parts of isobornyl acrylate, 10 parts of beta-carboxyethyl acrylate, and 3 parts of a photoinitiator (see note 1) to provide an ultraviolet curable coating composition having a room temperature viscosity of 9120 centipoises. On ultraviolet cure of a film cast on glass and removed to provide a film having a thickness of 3 mil, the cured film was found to have excellent properties closely resembling that of a Nylon film of the same thickness. These properties will be tabulated hereinafter. Note 1: benzil dimethyl ketal (Irgacure 651 supplied by Ciba-Geigy may be used) Note 2: a dimethyl polysiloxane polycarbinol graft polymer (the Dow Corning product DC-190 may be used)

The coating performance obtained in Examples 3, 4 and 5 are here compared with the same performance parameters for the best epoxy urethane acrylate radiation curable coating composition now used for optical fiber topcoating (identified as "prior" in the Table), and also with the performance provided by Nylon 11.

TABLE

| Property | Ex. 3 | Ex. 4 | Ex. 5 | prior | Nylon |
|---|---|---|---|---|---|
| Tensile (psi) | 2776 | 4203 | 3228 | 3500 | 7100* |
| Elongation (percent) | 160 | 61 | 109 | 12 | 300 |
| Modulus (psi) | 79571 | 127400 | 71360 | 100000 | 143000 |
| Rupture (in-lb./in$^3$) | 6413 | 3957 | 5253 | 800 | |
| Water Vapor Transmission (metric perm-cm) | — | 0.013 | 0.014 | 0.017 | |

The above coating compositions were clear.

As will be evident, the polycarbonate diol-based polyurethane diacrylates are uniquely suited to the overcoating of buffer-coated optical glass fiber.

What is claimed is:

1. A resin buffer-coated and topcoated optical glass fiber in which the topcoat is an ultraviolet cured coating of an ultraviolet curable coating composition which, when formed into a 3 mil cured test film, has a tensile strength of at least 2500 psi., a tensile modulus measured at room temperature of at least 50,000 psi., and an elongation in excess of about 40%, said composition comprising from 30% up to about 80% of total reactive components of diacrylate-functional polyurethane which is the linear polyurethane reaction product of polycarbonate diol with organic diisocyanate end capped with acrylate groups and having the formula:

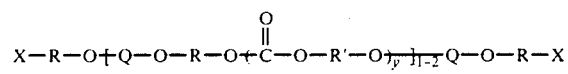

in which R is alkylene having from 1–20 carbon atoms; R' is the residue of an alkylene diol containing from 2–12 carbon atoms; Q is the residue of an organic diisocyanate; X is the residue of acrylic acid; y is at least 1; and R' and y are selected to provide a molecular weight for the polycarbonate diol reactant of from 300 to 3000, and at least 15% of total reactive components of liquid monoethylenically unsaturated monomer having a glass transition temperature above about 55° C.

2. A coated optical fiber as recited in claim 1 in which said buffer coating on said optical glass fiber has a room temperature tensile modulus below 10,000 psi.

3. A coated optical fiber as recited in claim 2 in which said buffer coating on said optical glass fiber has a room temperature tensile modulus below 2,000 psi.

4. A resin buffer-coated and topcoated optical glass fiber in which the buffer coating has a room temperature tensile modulus of less than 10,000 psi., and the topcoat is an ultraviolet cured coating, which, in a 3 mil test film, has a tensile strength of at least 2500 psi., a tensile modulus measured at room temperature of at least 50,000 psi., and an elongation in excess of about 100%, said topcoat comprising from 40% up to about 70% of total reactive components of diacrylate-functional polyurethane which is the linear polyurethane reaction product of polycarbonate diol with organic diisocyanate end capped with acrylate groups and having the formula:

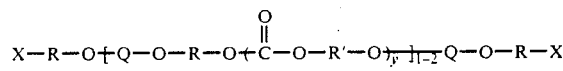

in which R is alkylene having from 2–4 carbon atoms; R' is the residue of an alkylene diol containing from 3–8 carbon atoms; Q is the residue of an organic diisocyanate; X is the residue of acrylic acid; y is at least 1; and R' and y are selected to provide a molecular weight for the polycarbonate diol reactant of from 600 to 1500, and at least 15% of total reactive components of monoethylenically unsaturated monomer selected from the group consisting of dimethyl acrylamide, N-vinyl pyrrolidone, isobornyl acrylate, acrylic acid and dicyclopentenyl acrylate.

5. A method of overcoating resin buffer-coated optical glass fiber in which the topcoat has the high strength and modulus combined with good elongation and water resistance associated with extruded jacket coatings, but which is applied by ordinary coating procedures and cured by exposure to ultraviolet radiation comprising, applying to resin buffer-coated optical glass fiber an ultraviolet-curable coating composition comprising from 30% up to about 80% of total reactive components of diacrylate-functional polyurethane which is the linear polyurethane reaction product of polycarbonate diol with organic diisocyanate end capped with acrylate groups and having the formula:

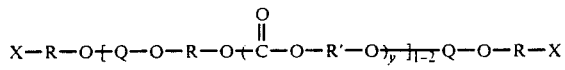

in which R is alkylene having from 1–20 carbon atoms; R' is the residue of an alkylene diol containing from 2–12 carbon atoms; Q is the residue of an organic diisocyanate; X is the residue of acrylic acid; y is at least 1; and R' and y are selected to provide a molecular weight for the polycarbonate diol reactant of from 300 to 3000, and at least 15% of total reactive components of liquid monoethylenically unsaturated monomer having a glass transition temperature above about 55° C., and then exposing the wet-coated fiber to ultraviolet light to cure the coating.

6. A method as recited in claim 5 in which said buffer coating on said optical glass fiber has a room temperature tensile modulus below 10,000 psi.

7. A method as recited in claim 5 in which said coating composition contains up to 45% of said monoethylenically unsaturated monomer having a glass transition temperature above about 55° C.

* * * * *